Dec. 20, 1960 W. C. POUPPIRT, JR 2,965,134
SAMPLING SYSTEM
Filed July 5, 1955
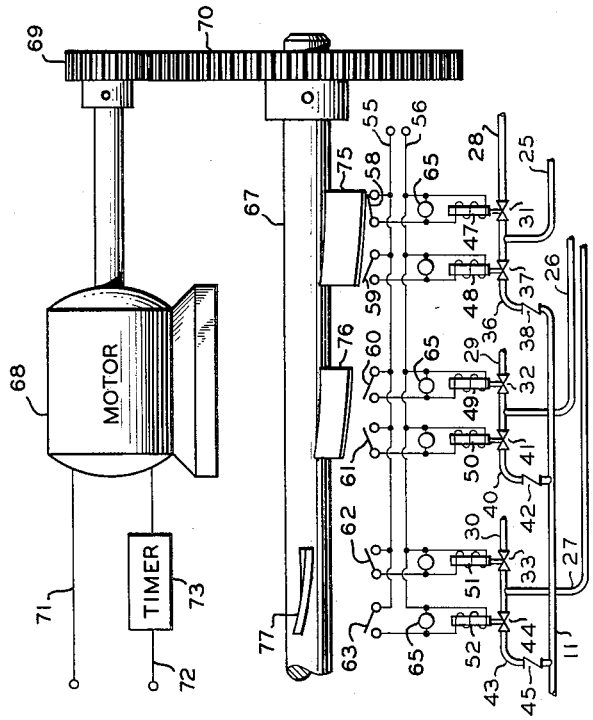
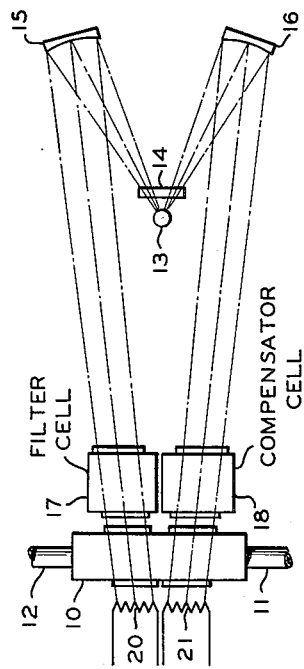
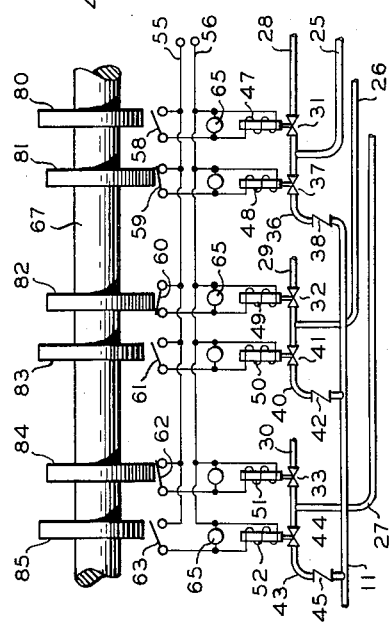
INVENTOR.
W. C. POUPPIRT, JR.
BY Hudson & Young
ATTORNEYS

United States Patent Office 2,965,134
Patented Dec. 20, 1960

2,965,134

SAMPLING SYSTEM

Walter C. Pouppirt, Jr., Bartlesville, Okla., assignor to Phillips Petroleum Company, a corporation of Delaware Filed July 5, 1955, Ser. No. 519,789

3 Claims. (Cl. 137—624.18)

This invention relates to multi-stream sampling systems. In another aspect it relates to apparatus to operate a plurality of valves sequentially.

This application is a continuation-in-part of my co-pending application Serial No. 202,617, filed December 26, 1950, which has matured into Patent No. 2,721,578.

It is customary practice to connect conduits conveying a plurality of fluid streams to be tested through a valve system which is actuated to direct the sample streams successively to the analyzing apparatus. In order to obtain a fresh sample from each stream it is necessary to purge the sample lines immediately before taking the sample. In accordance with the present invention a control system is provided to supply a plurality of fluids sequentially to an analyzer. A plurality of sample stream conduits are connected to a common outlet conduit through respective first valves. The sample stream conduits are also vented through respective second valves. The valves are actuated sequentially by a cam supporting rotating shaft so that each sample stream is purged shortly before its entry into the common outlet conduit which communicate with an analyzer. This provides for the introduction of a plurality of sample streams sequentially into an analyzer and the venting of each sample stream immediately before its entry into the analyzer. In another embodiment of this invention the sample streams are purged continuously except during the time intervals they are passed into the analyzer.

Accordingly, it is an object of this invention to provide a control system to supply a plurality of fluid streams sequentially to a common conduit.

Another object is to provide a cam operated means for actuating a plurality of valves sequentially.

Other objects, advantages and features of the invention should become apparent from the following detailed description taken in conjunction with the accompanying drawing in which:

Figure 1 is a schematic representation of an optical analyzer which can be employed in conjunction with the valve control system of this invention;

Figure 2 is a schematic representation of a first embodiment of the valve control system of this invention; and Figure 3 is a schematic representation of a second embodiment of the valve control system of this invention.

In Figure 1 there is shown an optical analyzer which can be employed to determine the concentration of particular constituents in a fluid stream. A fluid stream to be analyzed is directed into a sample cell 10 by a conduit 11 and is vented through a conduit 12. A source 13 of infrared or other suitable radiation is provided to direct two beams through a window 14 against a pair of respective front surface concave reflectors 15 and 16. The beams of radiation are reflected through a filter cell 17 and a compensator cell 18, respectively. Both beams then pass through sample cell 10 and impinge upon respective detecting elements 20 and 21, which can be temperature sensitive resistance elements. These two elements can be connected in an electrical bridge circuit to measure differences in resistance due to varying amounts of radiation impinging thereon. A suitable bridge circuit for use in this manner is disclosed in U.S. Patent 2,579,825. Cells 10, 17 and 18 are provided with windows which are transparent to the radiation employed. If source 13 provides infrared radiation, the windows can be formed of a halide such as silver chloride, calcium fluoride, or sodium fluoride or quartz. Filter cell 17 is filled with a pure material or a mixture of materials having radiation absorption characteristics the same as the absorption characteristics of the material or component to be measured in the test stream. The compensator cell 18 preferably contains air or other transparent substance.

The beams of radiation incident upon detectors 20 and 21 produce temperature changes therein which vary the electrical resistances of the elements. The difference in resistance of the two elements is a measure of the amount of the pure component to be detected in the sample stream circulated through cell 10. Obviously, other types of radiation besides infrared can be employed to advantage for some applications.

The valve control system of the present invention is provided to transmit a plurality of sample streams sequentially through sample cell 10. These sample streams can be supplied by a plurality of conduits 25, 26 and 27, illustrated in Figure 2. Vent lines 28, 29 and 30, having respective valves 31, 32 and 33 therein, communicate with respective conduits 25, 26 and 27. Conduit 25 is connected to outlet conduit 11 by means of a conduit 36 having a valve 37 and a check valve 38 therein. Conduit 26 is connected to conduit 11 by means of a conduit 40 having a valve 41 and a check valve 42 therein. Conduit 27 is connected to conduit 11 by means of a conduit 43 having a valve 44 and a check valve 45 therein. Valves 31, 37, 32, 41, 33 and 44 are actuated by respective solenoids 47, 48, 49, 50, 51 and 52. In the absence of current being supplied to these solenoids the associated valves are closed. The end terminals of solenoids 47, 48, 49, 50, 51 and 52 are connected across power supply leads 55 and 56 through respective switches 58, 59, 60, 61, 62 and 63. A current source, not shown, is connected between power leads 55 and 56. An indicating lamp 65 is connected in parallel with each of the solenoids to indicate energization thereof.

The several switches are actuated by rotation of a shaft 67 which is driven by a motor 68 through gears 69 and 70. One terminal of motor 68 is connected by a lead 71 to one terminal of a power supply, not shown. The second terminal of motor 68 is connected to a power supply lead 72 through a timer 73. Timer 73 functions to permit motor 68 to be energized for short periods of time at a predetermined frequency. This serves to rotate shaft 67 predetermined amounts periodically. Shaft 67 is provided with a plurality of cams or fin sections 75, 76 and 77 which extend in a generally helical path about the shaft. In Figure 2 it is assumed that shaft 67 rotates in a counter-clockwise direction when viewed from right to left. The ends of the fins which extend the farthest in the direction of shaft rotation are on substantially the same longitudinal line as the other end of the next preceding fin.

In the operation of the valve illustrated in Figure 2, shaft 67 is rotated so that fin 75 first closes switch 58. This energizes solenoid 47 to open valve 31 so that the sample stream supplied by conduit 25 is vented through conduit 28. At the end of a predetermined interval, timer 73 energizes motor 68 to rotate shaft 67 so that fin 75 closes switch 59 and fin 76 closes switch 60. At this time fin 75 has rotated so that switch 58 is again opened. At this second position solenoids 48 and 49 are energized so that the sample stream supplied by conduit 25 is directed to sample cell 10 through conduits 36 and 11. The sample stream supplied by conduit 26 is vented through conduit 29. At the end of a second predetermined interval, timer 73 again energizes motor 68 so that shaft 67 rotates until fin 76 closes switch 61 and fin 77 closes switch 62. Switch 60 is opened. The sample stream supplied by conduit 26 is directed through conduits 40 and 11 to cell 10. The sample stream supplied by conduit 27 is vented through conduit 30.

From the foregoing description of the operation of the apparatus of Figure 2 it can be seen that the sample streams are supplied sequentially to the sample cell of the analyzer. Immediately prior to the entry of a given sample stream into the analyzer, that sample is vented in order that a fresh sample is supplied. This is accomplished without the loss of an excessive amount of the fluid to be analyzed because the sample stream is purged for only a short period before its entry into the analyzer. Obviously, as many sample streams as desired can be provided.

In some applications of the control system of this invention it is not necessary to conserve the amount of the sample streams and it may be advantageous to purge continuously the sample streams not being supplied to the analyzer. This can readily be accomplished by the apparatus illustrated in Figure 3 which is generally similar to that shown in Figure 2 and wherein corresponding elements are designated by like reference numerals. Switches 58, 59, 60, 61, 62 and 63 are actuated by respective individual cams 80, 81, 82, 83, 84 and 85 which are mounted on shaft 67. Cams 81, 83 and 85 are of such configuration that switches 59, 61 and 63 are closed sequentially by rotation of shaft 67. This allows the passage of sample streams from conduits 25, 26 and 27 into the analyzer in sequence. Cams 80, 82 and 84 are of such configuration that switch 58 is opened when switch 59 is closed, switch 60 is opened when switch 61 is closed and switch 62 is opened when switch 63 is closed. In this manner the sample streams supplied by conduits 25, 26 and 27 are vented continuously except during the intervals when these particular samples are directed to the analyzer.

From an inspection of Figures 2 and 3 it should be evident that the timing sequence provided by the apparatus of Figure 2 can be accomplished by individual cams such as shown in Figure 3 wherein these individual cams are of proper configuration to vent each sample stream a predetermined time interval immediately following the entry of that stream into the analyzer.

While the invention has been described in conjunction with present preferred embodiments it should be evident that it is not limited thereto.

What is claimed is:

1. A valve assembly comprising a plurality of separate inlet conduits to supply fluids, an outlet conduit, a plurality of first electrically operated valves to connect respective ones of said inlet conduits to said outlet conduit, a plurality of second electrically operated valves having the inlets thereof connected to respective ones of said inlet conduits and a vent conduit connected to each of the outlets, a shaft, means to rotate said shaft, a source of electrical energy, and a plurality of valve energizing means carried in part by said shaft to connect said valves to said source of electrical energy to open said first and second valves in timed sequence so that fluids supplied by each of said inlet conduits are first vented in sequence through a respective one of said second valves and then passed to said outlet conduit through respective ones of said first conduits in sequence.

2. A valve assembly comprising first and second separate inlet conduits to supply first and second fluids; an outlet conduit; first and second electrically operated valves to connect said first and second conduit, respectively, to said outlet conduit; third and fourth electrically operated valves having the inlets thereof connected to said first and second inlet conduits and a vent conduit connected to each of the outlets, respectively; circuit means including a source of electrical energy; a shaft; means to rotate said shaft; and extension means on said shaft to connect said circuit means to said valves to open and subsequently close said third, first, fourth and second valves in sequence in the order named.

3. The combination in accordance with claim 2 wherein said extension means comprises first and second curved bars extending from said shaft, said first bar actuating a portion of said circuit means to open and close said third and first valves, and said second bar actuating a portion of said circuit means to open and close said fourth and second valves.

References Cited in the file of this patent
UNITED STATES PATENTS

| | | |
|---|---|---|
| 1,759,636 | Turner | May 20, 1930 |
| 2,030,394 | Pierce | Feb. 11, 1936 |
| 2,185,394 | Arbogast | Jan. 2, 1940 |
| 2,406,192 | Cantrell | Aug. 20, 1946 |
| 2,453,409 | Chace | Nov. 9, 1948 |
| 2,467,461 | Blanding | Apr. 19, 1949 |
| 2,505,810 | Svenson | May 2, 1950 |
| 2,691,475 | Jordan | Oct. 12, 1954 |

UNITED STATES PATENT OFFICE
CERTIFICATION OF CORRECTION

Patent No. 2,965,134  December 20, 1960

Walter C. Pouppirt, Jr.

It is hereby certified that error appears in the above numbered patent requiring correction and that the said Letters Patent should read as corrected below.

Column 4, line 6, after "supply" insert -- a plurality of --.

Signed and sealed this 13th day of June 1961.

(SEAL)
Attest:

ERNEST W. SWIDER
Attesting Officer

DAVID L. LADD
Commissioner of Patents